(12) United States Patent
Hata et al.

(10) Patent No.: US 11,029,689 B2
(45) Date of Patent: Jun. 8, 2021

(54) VEHICLE CONTROL SYSTEM

(71) Applicant: TOYOTA JIDOSHA KABUSHIKI KAISHA, Toyota (JP)

(72) Inventors: Kensei Hata, Sunto-gun (JP); Hiroaki Kodera, Susono (JP); Takahito Endo, Sunto-gun (JP); Naoki Harayama, Sunto (JP); Katsuya Iwazaki, Susono (JP); Yushi Seki, Susono (JP); Hideaki Komada, Gotemba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 58 days.

(21) Appl. No.: 16/121,740

(22) Filed: Sep. 5, 2018

(65) Prior Publication Data

US 2019/0072967 A1 Mar. 7, 2019

(30) Foreign Application Priority Data

Sep. 5, 2017 (JP) .............................. JP2017-170473

(51) Int. Cl.
*G05D 1/02* (2020.01)
*H05B 47/105* (2020.01)
*G06F 16/29* (2019.01)
*B60Q 1/08* (2006.01)

(52) U.S. Cl.
CPC ............ *G05D 1/0212* (2013.01); *B60Q 1/08* (2013.01); *G06F 16/29* (2019.01); *H05B 47/105* (2020.01); *B60Q 2200/30* (2013.01); *G05D 1/0231* (2013.01); *G05D 2201/0213* (2013.01)

(58) Field of Classification Search
CPC ............... G05D 1/0212; G05D 1/0231; G05D 2201/0213; G06F 16/29; B60Q 1/08; B60Q 2200/30; H05B 47/105
See application file for complete search history.

(56) References Cited

U.S. PATENT DOCUMENTS

| | | | | |
|---|---|---|---|---|
| 9,896,022 B1* | 2/2018 | Pertsel | ............... | G06K 9/00825 |
| 2012/0127313 A1* | 5/2012 | Ehlgen | ................. | B60Q 1/1423 |
| | | | | 348/149 |
| 2013/0135118 A1* | 5/2013 | Ricci | ........................ | G06N 5/02 |
| | | | | 340/932.2 |
| 2013/0300911 A1* | 11/2013 | Beckman | ........... | G02B 27/0101 |
| | | | | 348/335 |

(Continued)

FOREIGN PATENT DOCUMENTS

| | | |
|---|---|---|
| JP | H04-260106 A | 9/1992 |
| JP | 2009-040227 A | 2/2009 |

(Continued)

*Primary Examiner* — Behrang Badii
*Assistant Examiner* — Daniel L Greene
(74) *Attorney, Agent, or Firm* — Oliff PLC (57) ABSTRACT

A vehicle control system configured to maintain detection accuracy of an external sensor such as an on-board camera. The vehicle control system is applied to a vehicle that can be operated autonomously. A controller communicates with a database stored on the controller and a database stored on an external facility. The controller changes orientation of a headlamp toward an object detected by an on-board camera, in a case that the headlamp is turned on, and that information about the object detected by the on-board camera is not available in the database.

1 Claim, 4 Drawing Sheets

(56) References Cited

U.S. PATENT DOCUMENTS

| | | | | |
|---|---|---|---|---|
| 2013/0343071 | A1* | 12/2013 | Nagaoka | B60Q 9/008 |
| | | | | 362/466 |
| 2014/0226349 | A1* | 8/2014 | Morishita | B60R 1/00 |
| | | | | 362/466 |
| 2018/0186278 | A1* | 7/2018 | Song | B60Q 1/085 |
| 2018/0224080 | A1* | 8/2018 | Reisinger | F21S 41/675 |
| 2018/0253609 | A1* | 9/2018 | Potter | G06K 9/00791 |
| 2018/0257684 | A1* | 9/2018 | Fischer | B61L 23/041 |
| 2018/0349718 | A1* | 12/2018 | Skaff | G06K 9/00825 |

FOREIGN PATENT DOCUMENTS

| | | |
|---|---|---|
| JP | 2014-106854 A | 6/2014 |
| JP | 2016-49912 A | 4/2016 |
| JP | 2017-128282 A | 7/2017 |

* cited by examiner

VEHICLE CONTROL SYSTEM

CROSS REFERENCE TO RELATED APPLICATIONS

The present invention claims the benefit of priority to Japanese Patent Application No. 2017-170473 filed on Sep. 5, 2017 with the Japanese Patent Office, the entire contents of which are incorporated herein by reference in its entirety.

BACKGROUND

Field of the Invention

Embodiments of the present disclosure relate to the art of a vehicle control system configured to operate the vehicle autonomously.

Discussion of the Related Art

JP-A-2014-106854 describes an automatic driving vehicle control apparatus includes: detection means for acquiring at least any of vehicle traveling state, vehicle surrounding state, and driver state; automatic driving means for automatically driving a vehicle; and determination means for determining whether a condition for automatic driving is satisfied or not. According to the teachings of JP-A-2014-106854, when the determination means determines that the automatic driving condition is not satisfied during automatic driving, a warning is given to a driver to cancel the automatic driving. The automatic driving vehicle control apparatus taught by JP-A-2014-106854 is further configured to guide the vehicle to a stop spot when the driver does not cancel the automatic driving against the warning to cancel the automatic driving.

JP-A-2009-040227 describes a vehicular headlamp control device configured to adjust an illuminating angle of the headlamp according to changes in a road grade. According to the teachings of JP-A-2009-040227, the headlamp is turned downwardly when the road grade is changed to a downgrade, and the headlamp is turned upwardly when the road grade is changed to an upgrade.

By the control apparatus taught by JP-A-2014-106854, the automatic driving condition can be determined accurately. According to the teachings of JP-A-2014-106854, circumstances around the vehicle are obtained based on data detected by an on-board camera while with reference to a map database. For example, information that is not available in the map such as an electric message indicated on a message board, a disabled vehicle stopping on the road etc. has to be obtained by the on-board camera. However, detection accuracy of the on-board camera may not be maintained sufficiently in the nighttime or bad weather.

SUMMARY

Aspects of embodiments of the present disclosure have been conceived noting the foregoing technical problems, and it is therefore an object of the present disclosure is to provide a vehicle control system configured to maintain detection accuracy of an external sensor such as an on-board camera.

The vehicle control system according to the embodiments of the present disclosure is applied to a vehicle having: a prime mover; a brake device that applies braking force to a wheel; a steering system that turns the wheels; a lighting device that emits a light; an external sensor that detects external conditions; and a controller that controls the prime mover, the brake device, and the steering system based on information about external conditions transmitted from the external sensor, so as to operate the vehicle autonomously without requiring a manual operation. In order to achieve the above-explained objective, according to at least one embodiment of the present disclosure, an orientation of the lighting device is changeable. The controller communicates with a database stored on the controller and a database stored on an external facility. The controller is configured to change the orientation of the lighting device toward an object detected by the external sensor, in a case that the lighting device is turned on, and that the information about external conditions detected by the external sensor is not available in the database stored on the controller and the database stored on an external facility.

In a non-limiting embodiment, the information detected by the external sensor may include road information, and the database may include a map database storing the road information detected by the external sensor.

In a non-limiting embodiment, the controller may be further configured to further change the orientation of the lighting device within the object detected by the external sensor, in a case that detection accuracy of the external sensor is reduced as a result of orienting the lighting device toward the object.

In a non-limiting embodiment, the controller may be further configured to determine reduction in the detection accuracy of the external sensor if the object detected by the external sensor is a light emitting object or a reflection object. If the object is the light emitting object, the controller further changes the orientation of the lighting device within the object in such a manner as to emit light to a portion of the object other than a light emitting portion. If the object is the reflection object, the controller further changes the orientation of the lighting device within the object in such a manner as to emit light to a portion of the object other than a reflecting portion.

Thus, according to the embodiment of the present disclosure, an orientation of the lighting device is changed toward the object detected by the external sensor, in a case that the information about the object detected by the external sensor in e.g., the nighttime is not available in the database. According to the embodiment of the present disclosure, therefore, the information about the newly found object that is not available in the database can be specified clearly by the external sensor even in e.g., the nighttime.

In addition, in the case that the object detected by the external sensor is the light emitting object or the reflection object, the orientation of the lighting device is further changed within the object in such a manner as to emit light to a portion of the object other than the light emitting portion or the reflecting portion. According to the embodiment of the present disclosure, therefore, reflection between the light emitted from the lighting device and the light emitted from the object may be avoided. For this reason, the information about the newly found object that is not available in the database can be specified clearly by the external sensor even if the object is the light emitting object or the reflection object.

BRIEF DESCRIPTION OF THE DRAWINGS

Features, aspects, and advantages of exemplary embodiments of the present invention will become better under

DETAILED DESCRIPTION OF THE PREFERRED EMBODIMENT(S)

Embodiments of the present disclosure will now be explained with reference to the accompanying drawings. The control system according to at least one embodiment of the present disclosure may be applied to a hybrid vehicle powered by an engine and a motor(s), and an electric vehicle powered by the motor(s). In the vehicles of these kinds, electric power may be supplied to the motor not only from a battery but also from a fuel cell. In addition, the control system may also be applied to a conventional vehicle in which the vehicle is powered only by an engine.

Figure 1:
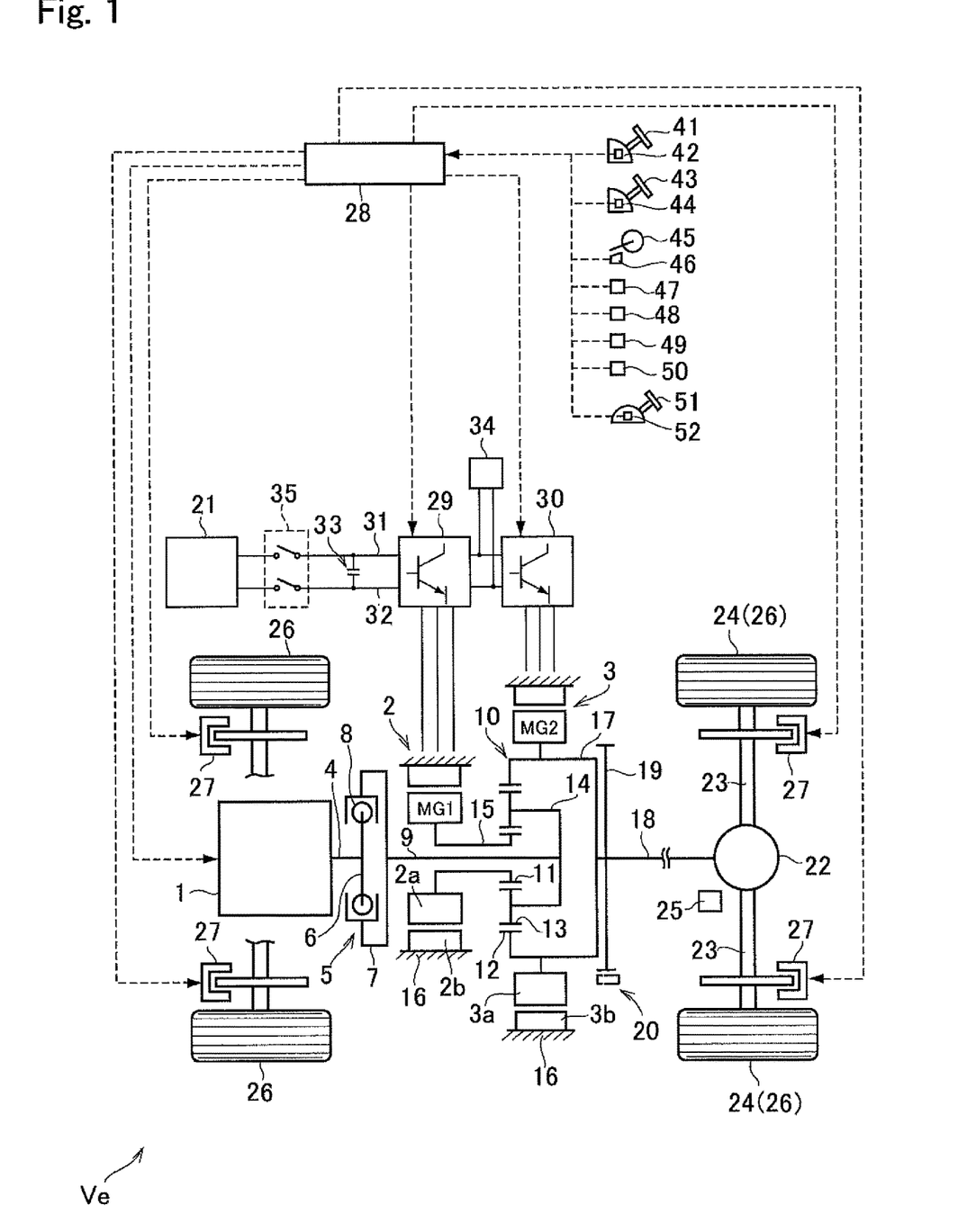
- FIG. 1 is a schematic illustration showing an example of a structure of the vehicle to which the control system according to the embodiment is applied.

Referring now to FIG. 1, there is schematically shown a structure of a hybrid vehicle (as will be simply called the "vehicle" hereinafter) Ve to which the control system according to the embodiment of the present disclosure is applied. In the vehicle Ve, a prime mover includes an engine 1, a first motor 2 and a second motor 3. A damper device 5 is disposed on an output shaft 4 of the engine 1 to absorb vibrations resulting from torque pulse. The damper device 5 comprises an input member 6 connected to the output shaft 4 of the engine 1, an output member 7 that is allowed to rotate relatively to the input member 6, and a plurality of elastic members 8 arranged in a circular manner at regular intervals to transmit torque of the input member 6 to the output member 7.

One end of an input shaft 9 is connected to the output member 7 to be rotated integrally therewith, and other end of the input shaft 9 is connected to a single-pinion planetary gear unit 10. The planetary gear unit 10 comprises a sun gear 11 fitted onto the input shaft 9, a ring gear 12 arranged concentrically with the sun gear 11, a plurality of pinion gears 13 interposed between the sun gear 11 and the ring gear 12, and a carrier 14 supporting the pinion gears 13 while allowing to revolve around the sun gear 11.

A first cylindrical shaft 15 extends from the sun gear 11 on the input shaft 9 toward the engine 1 to be connected to the first motor 2. For example, a permanent magnet type synchronous motor having a generating function may be used as the first motor 2. In the first motor 2, a rotor 2a is connected to the first cylindrical shaft 15 of the sun gear 11 to be rotated integrally therewith, and a stator 2b is fixed to a stationary member 16 such as a housing.

A second cylindrical shaft 17 extends from the ring gear 12 toward the second motor 3, and a rotor 3a of the second motor 3 is connected to the second cylindrical shaft 17 to be rotated integrally therewith. A stator 3b of the second motor 3 is fixed to the stationary member 16 such as a housing.

A leading end of the second cylindrical shaft 17 is connected to an output shaft 18 to be rotated integrally therewith, and a parking gear 19 as an external gear is fitted onto the output shaft 18 to be rotated integrally therewith. A parking lock mechanism 20 is arranged outside of the parking gear 19. The parking lock mechanism 20 comprises a parking pawl and a parking actuator (neither of which are shown). The parking actuator selectively brings the parking pawl into engagement with the parking gear 19 thereby locking the output shaft 18. An engagement between the parking pawl and the parking gear 19 may be maintained even after shutting down a battery as a power source 21.

A leading end of the output shaft 18 is connected to a differential gear unit 22, and the differential gear unit 22 is connected to a pair of drive wheels 24 through drive shafts 23 extending laterally. The drive wheels 24 are turned by a steering system 25. Rotations of the drive wheels 24 and another pair of wheels 26 are individually stopped by a brake 27.

An operating mode of the vehicle Ve may be selected from a hybrid mode (to be abbreviated as the "HV mode" hereinafter) in which the vehicle Ve is powered at least by the engine 1, and an electric vehicle mode (to be abbreviated as the "EV mode" hereinafter) in which the vehicle Ve is powered by at least one of the first motor 2 and the second motor 3. Specifically, in the HV mode, the engine 1 generates power in accordance with a required drive force calculated by a controller (i.e., ECU) 28, and the first motor 2 generates reaction torque in such a manner as to deliver the output power of the engine 1 to the drive wheels 24 through the planetary gear unit 10. In this situation, electric power generated by the first motor 2 may be supplied to the second motor 3 so that an output torque of the second motor may be applied to the second cylindrical shaft 17. That is, the output power of the engine 1 may be translated partially into the electric power by the first motor 2, and then translated into kinetic energy again by the second motor 3 to be applied to a torque transmission route between the engine 1 and the drive wheels 24. By contrast, when the first motor 2 serves as a motor while establishing the reaction torque, output torque of the first motor 2 applied to the transmission route may be translated into electric power by the second motor 3, thereby reducing power transmitted through the transmission route.

In the EV mode, the second motor 3 is operated as a motor in such a manner as to achieve a required drive force calculated by the controller 28. In this situation, fuel supply to the engine 1 and power supply to the first motor 2 may be stopped.

As shown in FIG. 1, the first motor 2 is connected to a first inverter 29, and the second motor 3 is connected to a second inverter 30. The first inverter 29 and the second inverter 30 are also connected to an output terminal of the battery 21 through a positive bus line 31 and a negative bus line 32. The first motor 2 and the second motor 3 are also connected to each other through the positive bus line 31 and the negative bus line 32 so that electric power generated by one of the motors 2 and 3 is supplied to the other motor 2 or 3. A capacitor 33 for storing electric power is connected parallel to the positive bus line 31 and the negative bus line 32, and an auxiliary 34 e.g., a compressor for activating an air conditioner is also connected to the positive bus line 31 and the negative bus line 32. In order to selectively allow and interrupt power supply from the battery 21 to the first inverter 29 and the second inverter 30, a relay switch 35 is individually disposed on the positive bus line 31 and the negative bus line 32 between the output terminal of the battery 21 and the first inverter 29 and the second inverter 30. The relay switch 35 may be turned on and turned off not only manually by manipulating a switch button or key, but also automatically at desired time by setting a timer or the controller 28.

Figure 2:
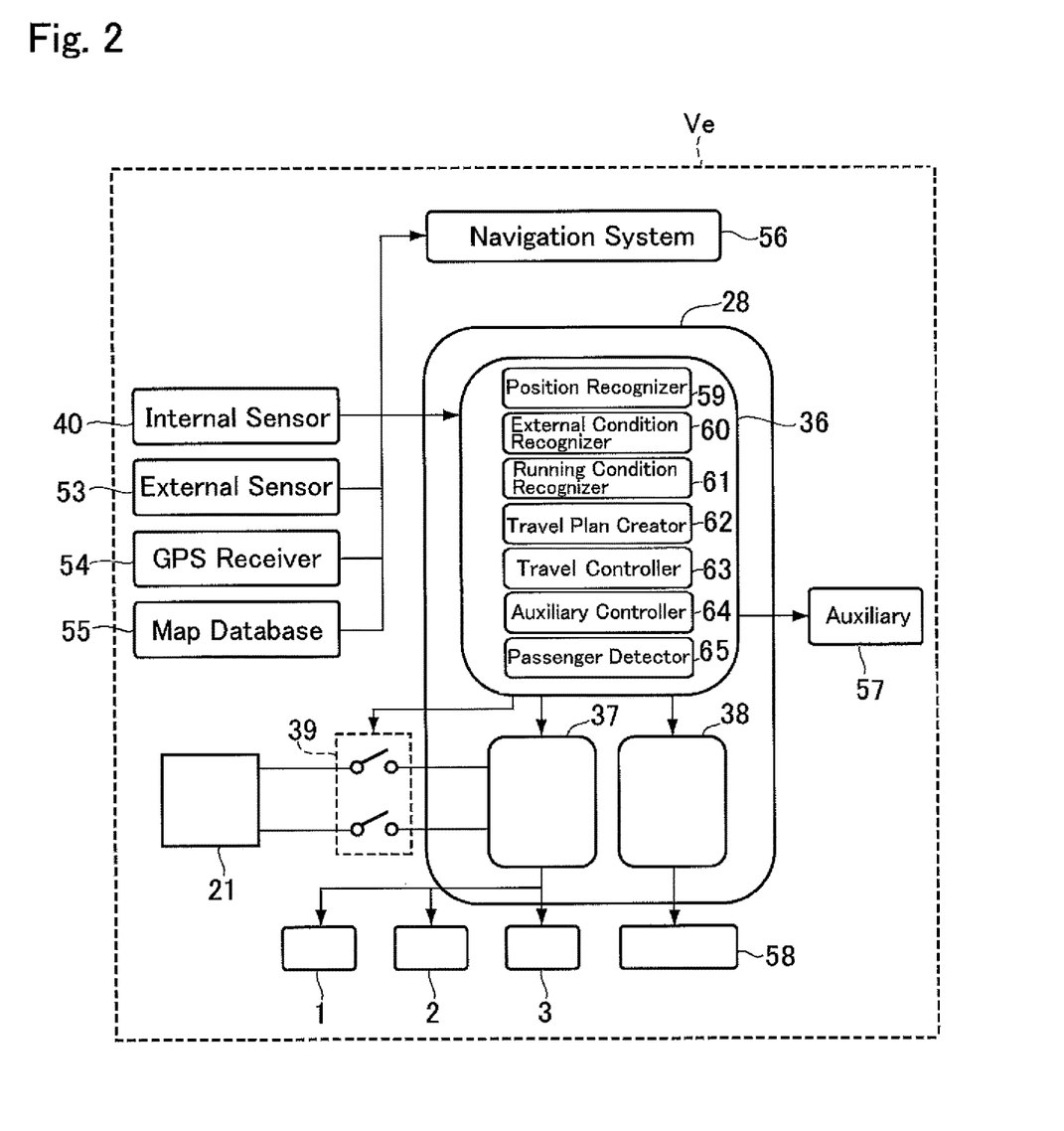
FIG. 2 is a schematic illustration showing a configuration of the control system according to the embodiment.

A configuration of the controller 28 is shown in FIG. 2. The controller 28 comprises a main controller 36, a drive controller 37 and a sub-controller 38. Output signals from the main controller 36 are sent to the drive controller 37 and the sub-controller 38. Incident signals to the drive controller 37 are converted into drive commands and further transmitted to a throttle actuator of the engine 1, the first motor 2, and the second motor 3. Incident signals to the sub-controller 38 is converted into appropriate command signals and further transmitted to actuators of the brake 27 etc.

In order to selectively connect and disconnect the drive controller 37 to/from the battery 21 depending on an operating condition of the switch button or key for energizing the relay switch 35, a main switch 39 is arranged between the battery 21 and the drive controller 37. For example, when the switch button is pressed, the main switch 39 is turned on, and then, if the switch button is pressed for a predetermined period of time, the relay switch 35 is turned on. The main switch 39 is controlled by the main controller 36 to automatically allow and interrupt electric power supply to the drive controller 37.

The main controller 36 is an electronic control unit composed mainly of a microcomputer. To the main controller 36, detection signals and information about operating conditions and behaviors of constituent elements of the vehicle Ve are transmitted from an internal sensor 40. Specifically, the internal sensor 40 includes an accelerator sensor 42 for detecting a position of an accelerator pedal 41, a brake sensor (or switch) 44 for detecting a depression of a brake pedal 43, a steering sensor 46 for detecting a steering angle of the steering wheel 45, a vehicle speed sensor 47 for detecting rotational speeds of the wheels 24 and 26, a longitudinal acceleration sensor 48 for detecting a longitudinal acceleration of the vehicle Ve, a lateral acceleration sensor 49 for detecting a lateral acceleration of the vehicle Ve, a yaw rate sensor 50 for detecting a yaw rate of the vehicle, a shift sensor 52 for detecting a position of a shift lever (or switch) 51 and so on. The main controller 36 transmits command signals for controlling the engine 1, the first motor 2 and the second motor 3 to the drive controller 37, and transmits command signals for controlling the brake 27 and so on to the sub-controller 38 based on incident signals from the internal sensor 40 as well as maps and formulas installed in advance. In FIG. 1, dashed-lines represent transmission of signals from the internal sensor 40 to the controller 28, and signals from the controller 28 to the engine 1, the first motor 2, the second motor 3, and the brake 27.

The control system according to the embodiments of the present disclosure is configured to operate the vehicle Ve autonomously. Specifically, the control system is configured to execute a starting operation, an accelerating operation, a steering operation, a braking operation, a stopping operation and etc. of the vehicle Ve completely autonomously at level 4 defined by the NHTSA (National Highway Traffic Safety Administration) or level 4 or 5 defined by the SAE (Society of Automotive Engineers), while recognizing and observing an external condition and a travelling condition. For this reason, the vehicle Ve may be operated not only autonomously with or without a driver (and a passenger) but also manually by the driver. The control system may also be configured to operate the vehicle Ve at level 3 at which an accelerating operation, a steering operation, a braking operation etc. are executed autonomously only in an allowable condition, and the driver has to manipulate the vehicle Ve upon request from the system.

As described, the vehicle Ve is operated autonomously while manipulating the engine 1, the first motor 2, the second motor 3, the brake 27, and so on by the controller 28. In addition, the steering system 25, the parking lock mechanism 20 and so on are also controlled by the controller 28.

In order to operate the vehicle Ve autonomously, detection signals from external sensors 53 for detecting external conditions are also sent to the main controller 36. For example, the external sensor 53 includes at least one of an on-board camera, a RADAR (i.e., a radio detection and ranging) a LIDAR (i.e., a laser imaging detection and ranging), an ultrasonic sensor and so on. Data detected by the external sensor 53 may be utilized in an inter-vehicle communication.

Specifically, the on-board camera is arranged inside of a windshield glass, and transmits recorded information about the external condition to the main controller 36. To this end, not only a monocular camera but also a stereo camera having a plurality of lenses and image sensors to achieve a binocular vision may be used as the on-board camera. If the stereo camera is used as the on-board camera, the main controller 36 is allowed to obtain three-dimensional information in the forward direction.

The RADAR is adapted to detect obstacles utilizing radio waves such as millimetric-waves and microwaves, and to transmit detected information to the main controller 36. Specifically, the RADAR detects an obstacle such as other vehicles and so on by emitting radio waves and analyzing the radio waves reflected from the obstacle.

Likewise, the LIDAR is adapted to detect obstacles utilizing laser light and to transmit detected information to the main controller 36. Specifically, the LIDAR detects an obstacle such as other vehicles and so on by emitting laser light and analyzing the laser light reflected from the obstacle.

Information about other vehicles around the vehicle Ve such as positions, speeds, directions, operating modes etc. may be obtained through the inter-vehicle communication system to support safe driving. Such inter-vehicle communication is available among the vehicles individually having an on-board equipment for intelligent transport systems even where infrastructure has not yet been improved.

In addition, the vehicle Ve is further provided with a GPS (i.e., global positioning system) receiver 54, a digital map database 55, and a navigation system 56. Specifically, the GPS receiver 54 is adapted to obtain a position (i.e., latitude and longitude) based on incident signals from GPS satellites, and to transmit the positional information to the main controller 36. The map database 55 may be installed in the main controller 36, but map database stored on external facility such as an online information processing systems may also be available. The navigation system 56 is configured to determine a travelling route of the vehicle Ve based on the positional information obtained by the GPS receiver 54 and the map database 55.

The main controller 36 carries out calculations based on the incident data or information from the internal sensor 40 and the external sensor 53 as well as the preinstalled data, and calculation results are sent in the form of command signal to the drive controller 37, the sub-controller 38 and the auxiliary 57. The incident signals to the drive controller 37 are converted into drive commands, and further transmitted to the throttle actuator of the engine 1, the first inverter 29 and the second inverter 30 of the first motor 2 and the second motor 3. The incident signals to the sub-controller 38 are converted into appropriate command signals and further transmitted to actuators 58 of the brake 27, the steering system 25 and so on.

The actuator 58 includes a brake actuator, a steering actuator and so on. Specifically, the brake actuator is adapted to actuate the brake 27 to control braking force applied to the wheels 24 and 26 in response to the command signal from the sub-controller 38. The steering actuator is adapted to activate an assist motor of the steering system 25 to control a steering torque in response to the command signal from the sub controller 38.

The auxiliary 57 includes devices that are not involved in propulsion of the vehicle Ve such as a wiper, a headlamp, a direction indicator, an air conditioner, an audio player and so on.

The main controller 36 comprises a position recognizer 59, an external condition recognizer 60, a running condition recognizer 61, a travel plan creator 62, a travel controller 63, an auxiliary controller 64, a passenger detector 65 and so on.

Specifically, the position recognizer 59 is configured to recognize a current position of the vehicle Ve on the map based on the positional information received by the GPS receiver 54 and the map database 55. The current position of the vehicle Ve may also be obtained from the positional information used in the navigation system 56. Optionally, the vehicle Ve may also be adapted to communicate with external sensors arranged along the road to obtain the current position of the vehicle Ve.

The external condition recognizer 60 is configured to recognize external condition of the vehicle Ve such as a location of a traffic lane, a road width, a road configuration, a road gradient, an existence of obstacles around the vehicle Ve and so on, based on the recorded information of the on-board camera, or detection data of the RADAR or the LIDAR. Optionally, weather information, a friction coefficient of road surface etc. may be obtained according to need.

The running condition recognizer 61 is configured to recognize running condition of the vehicle Ve such as a vehicle speed, a longitudinal acceleration, a lateral acceleration, a yaw rate and so on based on detection data collected by the internal sensors 40.

The travel plan creator 62 is configured to create a travel locus of the vehicle Ve based on a target course determined by the navigation system 56, a position of the vehicle Ve recognized by the position recognizer 59, and an external condition recognized by the external condition recognizer 60. That is, the travel plan creator 62 creates a travel locus of the vehicle Ve within the target course in such a manner that the vehicle Ve is allowed to travel safely and properly while complying traffic rules.

In addition, the travel plan creator 62 is further configured to create a travel plan in line with the created travel locus. Specifically, the travel plan creator 62 creates a travel plan in line with the target course based on the external conditions recognized by the external condition recognizer 60 and the map database 55.

Specifically, the travel plan is created based on prospective data after few seconds from the present moment to determine a future condition of the vehicle Ve such as a driving force or the like required in future. Optionally, the travel plan may also be created based on prospective data after several ten seconds depending on the external conditions and the running conditions. Thus, the travel plan creator 62 creates a future plan to change a vehicle speed, acceleration, steering torque etc. during travelling along the target course in the form of e.g., a map.

Alternatively, the travel plan creator 62 may also create a pattern to change the vehicle speed, acceleration, steering torque etc. between predetermined points on the travel locus. Specifically, such patterns may be determined by setting target values of those parameters at each point on the travel locus taking account of a required time to reach the point at the current speed.

As described, the controller 28 is configured to work with the adaptive cruise control system or cooperative adaptive cruise control system, and the travel plan may also be created in such a manner as to follow the preceding vehicle while communicating with the other vehicles. The adaptive cruise control system may be manipulated by switches arranged in the vicinity of the steering wheel or within a steering pad. Specifically, activation of the cruise control system, selection of a control mode, setting a target distance from a preceding vehicle etc. may be executed by manipulating the switches.

The travel controller 63 is configured to operate the vehicle Ve autonomously in line with the travel plan created by the travel plan creator 62. To this end, specifically, the travel controller 63 transmits command signals to the actuators 58, or the engine 1, the first motor 2 and the second motor 3 through the drive controller 37 and the sub-controller 38.

The auxiliary controller 64 is configured to operate the auxiliaries 57 such as the wiper, the headlamp, the direction indicator, the air conditioner, the audio player and so on in line with the travel plan created by the travel plan creator 62.

The passenger detector 65 is configured to determine the existence of passenger in the vehicle Ve and the preceding vehicle. For example, the passenger detector 65 determines the existence of passenger in the vehicle Ve based on a fact that a power switch, an ignition switch, or a start button is turned on, that a passenger sitting on a vehicle seat is detected, that a seat belt is fastened, or that the steering wheel is turned. Meanwhile, the passenger detector 65 determines the existence of passenger in the preceding vehicle by obtaining information about the preceding vehicle through the inter-vehicle communication, or by analyzing information obtained by the on-board camera.

Thus, the vehicle Ve shown in FIG. 1 may be operated autonomously while obtaining external conditions based on the data collected by the information detector such as the external sensor including the on-board camera while with reference to the map database 55. Specifically, information that is not available in the map database 55 such as a message indicated on a message board, a disabled vehicle stopping on the road etc. are obtained by the on-board camera. However, detection accuracy of the on-board camera may not be maintained sufficiently in the nighttime or in bad weather. In order to avoid reduction in the detection accuracy of the on-board camera, the controller 28 executes a routine shown in FIG. 3.

Figure 3:
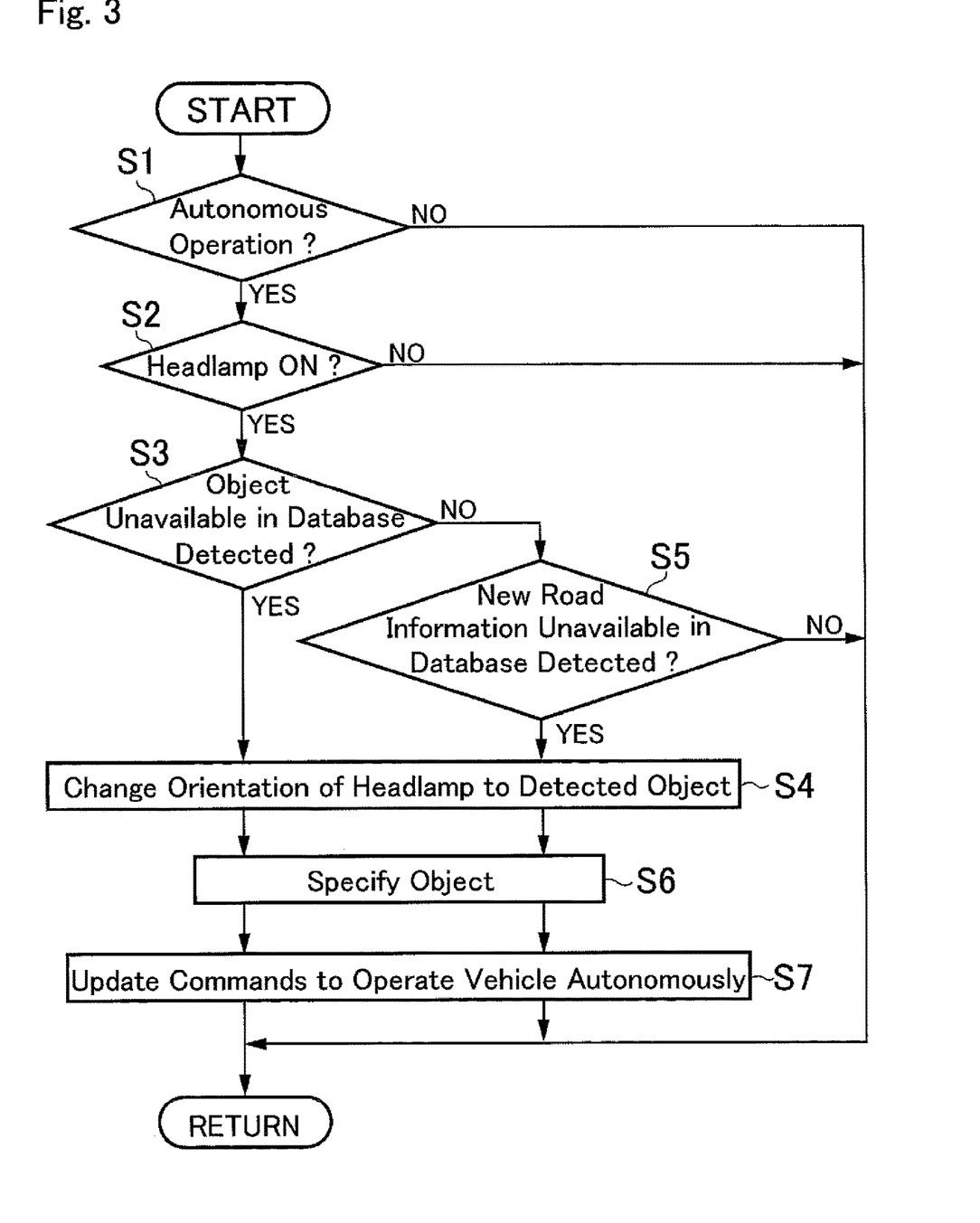
FIG. 3 is a flowchart showing an example of a routine executed by the control system.

At step S1, it is determined whether the vehicle Ve is being operated autonomously. Specifically, such determination of the current operating mode can be made based on a signal from the switch for selecting the operating mode, or based on a flag representing the autonomous mode. If the vehicle Ve is currently not operated autonomously so that the answer of step S1 is NO, the routine returns.

In this case, the controller 28 determines that the vehicle Ve is currently operated manually by a driver in the manual mode. As described, the vehicle Ve may be operated autonomously with or without a driver (or a passenger(s)). A presence of the passenger may be determined by the passenger detector 65 based on operating states of the above-explained devices. Instead, a presence of the passenger may be determined based on a signal from a biometric passenger sensor such as an infrared sensor for detecting a body temperature of the passenger, and a motion sensor such as a Doppler sensor for detecting a body movement of the passenger.

By contrast, if the vehicle Ve is being operated autonomously so that the answer of step S1 is YES, the routine progresses to step S2 to determine whether a headlamp as a lighting device of the vehicle Ve is turned on. According to the embodiment, the lighting device includes not only the headlamp but also a front fog lamp and a lamp of the on-board camera. The lighting device may further include an infrared lamp and a millimeter-wave RADAR. Thus, according to the embodiment, the lighting device includes not only the lighting device for emitting visible light but also the lighting device for emitting invisible light. As described, the headlamp is included in the auxiliary 57, and controlled automatically by the auxiliary controller 64.

For example, the headlamp is turned on when travelling in the nighttime, when travelling in the fog, when travelling in the rain, and when travelling through a tunnel. If the headlamp is turned off so that the answer of step S2 is NO, the routine returns without carrying out any specific control.

By contrast, if the headlamp is turned on so that the answer of step S2 is YES, the routine progresses to step S3 to determine whether an object whose information is not available in the database is detected, and whether the detected object is a physical object.

During propulsion in the autonomous mode, the external sensor 53 detects various objects such as a road sign, a road depression, a railroad crossing and so on while with reference to the database stored on the main controller 36 and the data which has been collected by the external sensor 53. If the information about the newly detected object is not found in the database stored on the main controller 36, and the newly detected object is a physical object e.g., a disabled vehicle stopping on the road so that the answer of step S3 is YES, the routine progresses to step S4 to change an orientation of the headlamp (i.e., a direction of radiation) toward the detected object. In other words, if the newly detected object is not available in the database, the headlamp is oriented to the newly detected object.

The external sensor 53 also detects road information about, a traffic congestion, a speed limit and so on indicated on a road sign and a message board, and the detected road information is stored on the map database 55.

The orientation of the lighting device may be change arbitrarily by the auxiliary controller 64 not only vertically but also horizontally.

According to the embodiment, therefore, the object whose information is not available in the database can be recognized clearly by the on-board camera even when the on-board camera is not allowed to recognize the object clearly such as in the nighttime. That is, if a stopping disabled vehicle is detected by the RADAR or the LIDAR but the details of the trouble has not yet been confirmed, the details of the trouble of the disabled vehicle can be confirmed by the on-board camera. For example, it is possible to confirm a fact that a tire(s) of the disabled vehicle is/are flattened, or that the disabled vehicle is overturned. In addition, if the disabled vehicle is out of fuel, such information may be obtained through the inter-vehicle communication.

By contrast, if the information about the newly detected object is not available in the database but the newly detected object is the road information so that the answer of step S3 is NO, the routine progresses to step S5 to determine whether the newly detected road information e.g., a message board is not available in the database. That is, at step S3, availability of the information about the newly found physical object in the database is determined. Meanwhile, at step S5, availability of the newly obtained road information in the database is determined. As described, such road information includes messages indicated on a message board about a traffic congestion, a speed limit etc. The answer of step S3 will also be YES if the information about the newly detected object has already been stored in the database. In this case, the routine returns through the below-mentioned step S5.

For example, the speed limit may be restricted due to bad weather, and some of traffic lanes may be closed due to traffic accident or road construction. Such road conditions change constantly, and the information stored in the database is updated continuously. Although the road sign or the message board is newly detected, it would be difficult to read the message indicated on e.g., the message board by the on-board camera in e.g., the nighttime. Specifically, in the nighttime, it would be difficult for the on-board camera to clearly recognize the speed limit indicated on the message board that is restricted due to bad weather or the like.

If the newly detected road information is not available in the database so that the answer of step S5 is YES, therefore, the routine also progresses to step S4 to change an orientation of the headlamp toward the detected object such as the message board.

By contrast, if the newly detected road information is available in the database so that the answer of step S5 is NO, the routine returns without changing the orientation of the headlamp.

Then, the routine progresses to step S6 to specify the detected object by the on-board camera. Specifically, in the case that the newly detected object is the physical object, details of the physical object is specified by the on-board camera. By contrast, in the case that the newly detected object is the road information, details of the message indicated on the message board or the like is read by the on-board camera. Thereafter, the database stored on the main controller 36 is updated at step S7 based on the information specified by the on-board camera, and the command signals to operate the vehicle autonomously are calculated by the main controller 36 based on the updated database. For example, the travel plan, the target vehicle speed, the pattern to change the vehicle speed the target course and so on are updated by the main controller 36 based on the updated database. Optionally, the database stored in the external online information processing systems may also be updated based on the updated database stored on the main controller 36. Thereafter, the orientation of the headlamp is retuned to an original position, and the routine returns.

Thus, according to the embodiment of the present disclosure, the headlamp is oriented to the newly found object during autonomous propulsion in e.g., the nighttime. According to the embodiment, therefore, the information about the newly found object that is not available in the database can be specified clearly by the external sensor 53 such as the on-board camera even in e.g., the nighttime. In other words, the on-board camera is allowed to specify the newly found object accurately even in the nighttime so that the external conditions around the vehicle Ve is detected correctly.

In addition, if the object is detected by the RADAR or the LIDAR but the details of the object has not yet been specified, the details of the object can be obtained by the on-board camera while emitting the light to the object.

Figure 4:
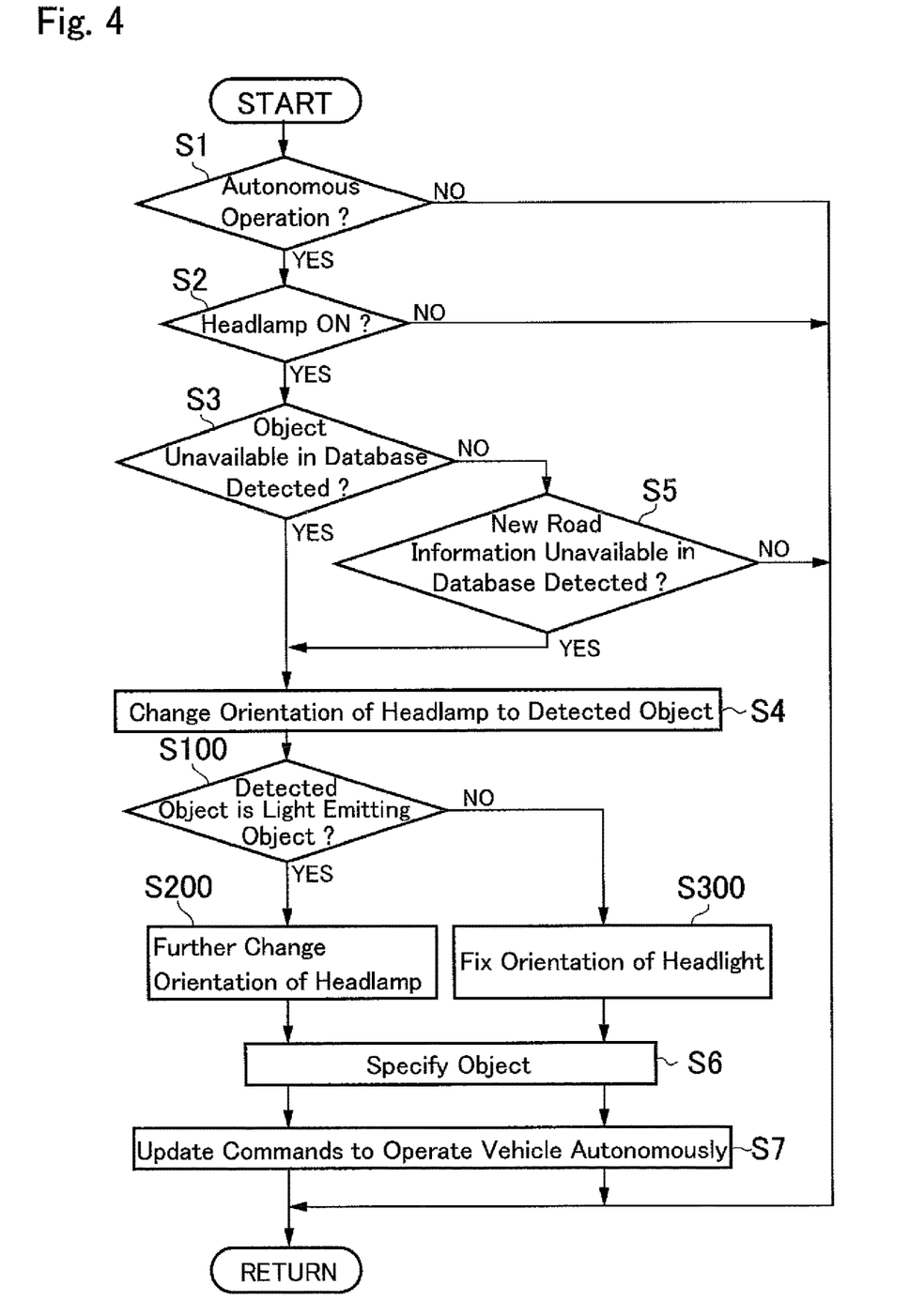
FIG. 4 is a flowchart showing another example of a routine executed by the control system.

If the detected object is a light emitting object, it would be difficult for the on-board camera to specify details of the object by emitting the light to the object due to reflection between the light emitted from the headlamp and the light emitted from the object. In order to avoid such disadvantage, the vehicle control system according to the embodiment may be further configured to execute a routine shown in FIG. 4. In FIG. 4, common step numbers are allotted to the steps in common with those in the routine shown in FIG. 3, and detailed explanations for the common steps will be omitted.

In the routine shown in FIG. 4, contents of steps S1 to S5 are similar to those of the routine shown in FIG. 3.

After changing the orientation of the headlamp to the detected object at step S4, it is determined at step S100 whether the object detected at step S3 or S5 is a light emitting object or a reflection object that makes the on-board camera difficult to specify the object if it is irradiated. For example, it would be difficult for the on-board camera to read a massage indicated on an electronic message board if the message board is irradiated by the light emitted from the headlamp. At step S100, therefore, reduction in detection accuracy of the on-board camera after orienting the headlamp to the object is determined. Specifically, the light emitting object includes an electronic construction signage, a flare, an electronic message board and so on, and the reflection object includes a rubber pole (i.e., a lane separation pole). If the detected object is the light emitting object or the reflection object so that the answer of step S100 is YES, the routine progresses to step S200 to further change the orientation of the headlamp within the object in such a manner as to emit the light to a portion of the object other than a light emitting portion or a reflection portion.

At step S100, reduction in the detection accuracy of the on-board camera is also determined even if the detection accuracy at the light emitting portion or the reflection portion of the object and the detection accuracy at the remaining portion of the object are identical to each other. In addition, the answer of step S100 will also be YES when the on-board camera is not allowed to clearly read the message indicated on the message board due to over exposure or the like. For example, such determination at step S100 may be made based on a threshold of illuminance or detection degree.

If the detected object is not the light emitting object or the reflection object so that the answer of step S100 is NO, the routine progresses to step S300 to fix the orientation of the headlamp changed at step S4 until the on-board camera is allowed to specify the object. For example, the orientation of the headlamp is fixed until the on-board camera is allowed to read the message indicated on the message board. Then, the detected object is specified by the on-board camera at step S6, and the database stored on the main controller 36 is updated at step S7 based on the information specified by the on-board camera. Thereafter, the orientation of the headlamp is retuned to the original position, and the routine returns. For example, in a case that the detected object is a disabled vehicle, the orientation of the headlamp is returned to the original position after passing the disabled vehicle.

Thus, by executing the routine shown in FIG. 4, the headlamp may also be oriented to the newly found object during autonomous propulsion in e.g., the nighttime. In addition, according to the routine shown in FIG. 4, if the detected object is the light emitting object or the reflection object, the orientation of the headlamp is adjusted within the object to emit the light to the portion of the object other than the light emitting portion or the reflection portion. According to the routine shown in FIG. 4, therefore, the information about the newly found object that is not available in the database can be specified clearly by the on-board camera in e.g., the nighttime, even if the object is the light emitting object or the reflection object.

Although the above exemplary embodiments of the present disclosure have been described, it will be understood by those skilled in the art that the present disclosure should not be limited to the described exemplary embodiments, and various changes and modifications can be made within the scope of the present disclosure. For example, any kinds of appropriate mechanism may be applied to change an orientation of the headlamp. In addition, if the newly found object that is the light emitting object or the reflection object, a light emitting period may be reduced to allow the on-board camera to specify the object accurately. Further, if the detected object is large, it is also possible to obtain details of the object while changing the orientation of the on-board camera.

What is claimed is:

1. A vehicle control system for use with a vehicle having: a prime mover; a brake device that applies braking force to a wheel; a steering system that turns the wheels; a lighting device that emits a light; an external sensor that detects external conditions; and a controller that controls the prime mover, the brake device, and the steering system based on information about the external conditions detected by the external sensor, so as to operate the vehicle autonomously without requiring a manual operation, the vehicle control system comprising:

a network interface that communicates with: (a) a first database stored in the vehicle, and (b) a second database stored in an external facility, both the first and second database containing a map database; and the controller being configured to:
detect whether an object having road information is present in a vicinity of the vehicle via the external sensor,
determine whether information about the road information of the detected object is not available in the map database of both the first database of the vehicle and the second database of the external facility via the network interface,
change the orientation of the lighting device toward the detected object when: (i) the lighting device is turned on, and (ii) the information about the road information of the detected object is not available in the map database of both the first database of the vehicle and the second database of the external facility, and
further change the orientation of the lighting device towards the detected object in a case when a detection accuracy of the external sensor is reduced as a result of orienting the lighting device toward the detected object, including:
determining that the detection accuracy of the external sensor is reduced when the detected object is a light emitting object or a reflection object,
further changing the orientation of the lighting device such that light is emitted to only a portion of the detected object that does not include a light emitting portion when the detected object corresponds to the light emitting object, and
further changing the orientation of the lighting device such that light is emitted to only a portion of the detected object that does not include a reflecting portion when the detected object corresponds to the reflection object.

* * * * *